UNITED STATES PATENT OFFICE.

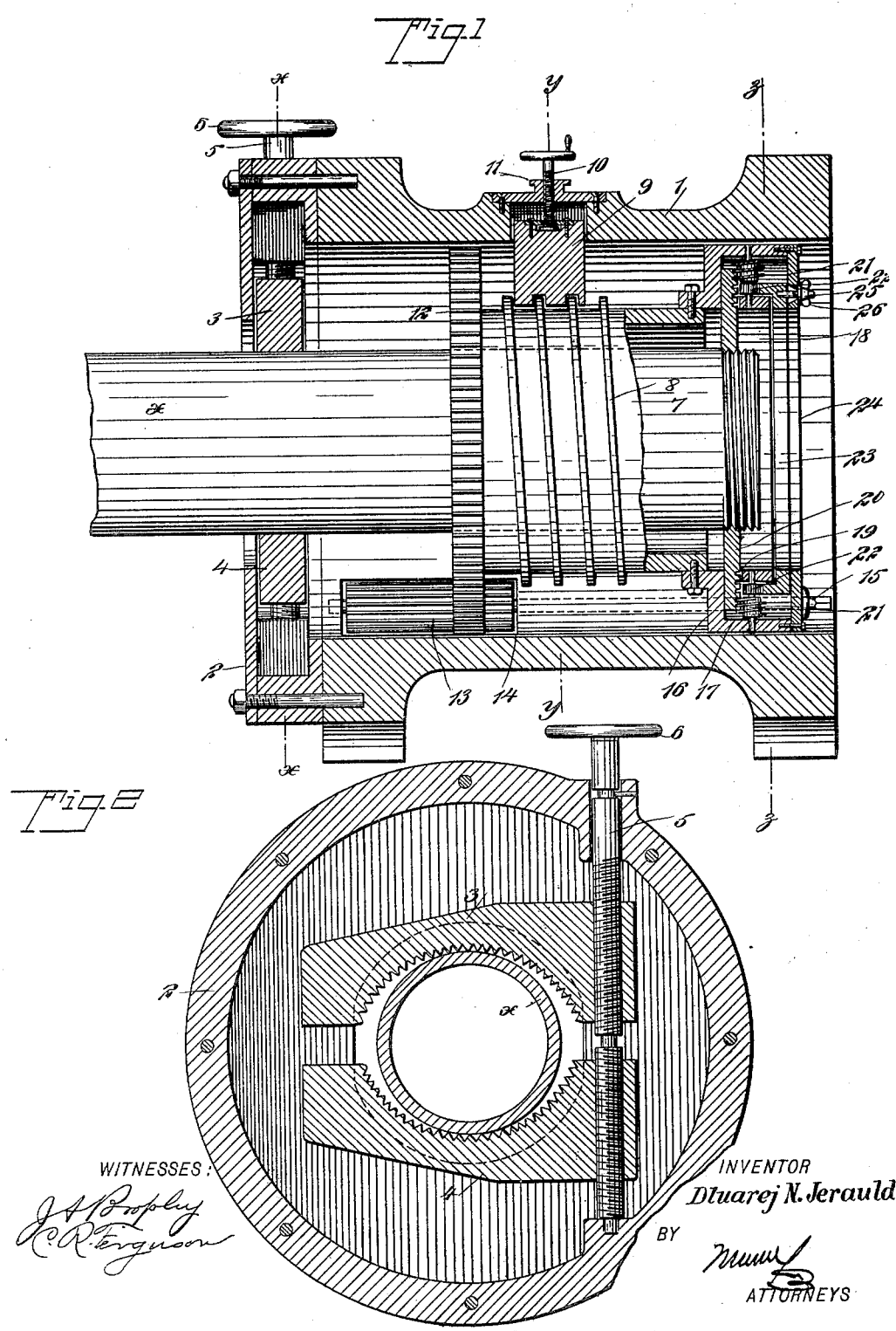

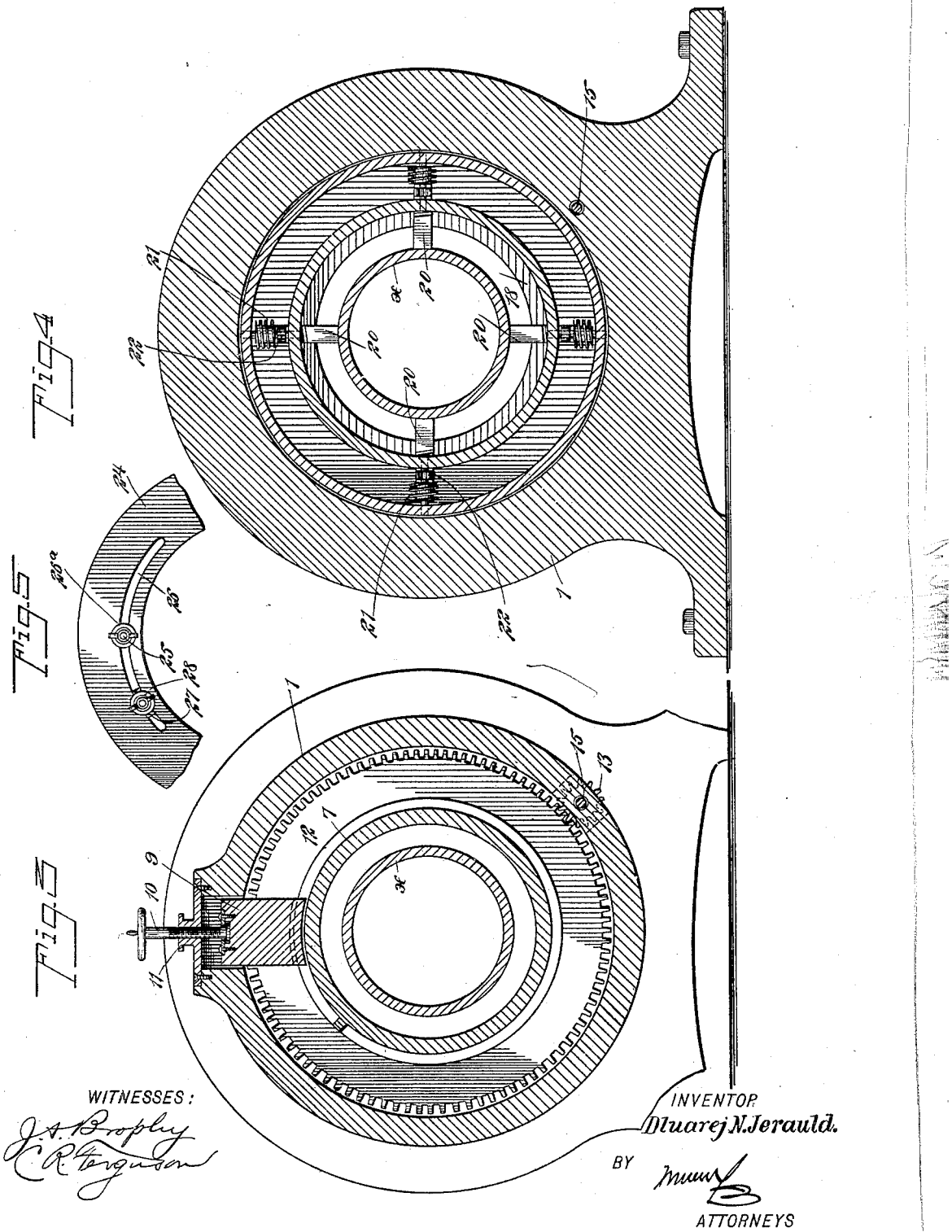

DLUAREJ NORWOOD JERAULD, OF BUFFALO, NEW YORK.

THREAD-CUTTER.

SPECIFICATION forming part of Letters Patent No. 659,975, dated October 16, 1900.

Application filed April 23, 1900. Serial No. 13,922. (No model.)

*To all whom it may concern:*

Be it known that I, DLUAREJ NORWOOD JERAULD, a citizen of the United States, and a resident of Buffalo, in the county of Erie and State of New York, have invented a new and Improved Thread-Cutter, of which the following is a full, clear, and exact description.

This invention relates to improvements in portable hand-power machines for cutting threads on pipes and rods of different gages; and the object of the invention is to improve the general construction of this class of devices, as well as to reduce and simplify the number of working parts.

I will describe a thread-cutter embodying my invention and then point out the novel features in the appended claims.

Reference is to be had to the accompanying drawings, forming a part of this specification, in which similar characters of reference indicate corresponding parts in all the figures.

Figure 1 is a sectional elevation of a thread-cutter embodying my invention. Fig. 2 is a section on the line $x\,x$ of Fig. 1. Fig. 3 is a section on the line $y\,y$ of Fig. 1. Fig. 4 is a section on the line $z\,z$ of Fig 1, and Fig. 5 is a fragmentary view showing a means for adjusting and clamping the cutting device.

Referring to the drawings, 1 designates the tubular casing of the machine, open at both ends. In a casing 2 at one end of the casing 1 are clamping-jaws 3 4, adapted to engage with a pipe $x$ or similar device for holding it rigidly in place while cutting a thread thereon. These jaws also operate to center the pipe, inasmuch as the jaws will move toward and from each other by means of right and left hand screw-threads on a screw-shaft 5, extending upward through the casing 2 and having a hand-wheel 6 on its outer end.

Movable longitudinally in the casing 1 is a cylinder 7, having a thread 8 on its outer surface for engaging with a threaded feed-block 9. The threaded feed-block 9 is adjustable to engage with the thread 8 or to move from engagement therewith by means of a screw-rod 10, engaging in a tapped plate 11, removably attached to the casing 1, as clearly indicated in Fig. 1. On the rear end of the cylinder 7 is a gear 12, adapted to be rotated by a pinion 13, which is of a suitable length to permit the gear 12 to slide thereon while the said gear is receiving rotary motion from the pinion. This pinion 13 is seated in a recess 14, formed in the casing 1, and it has an outwardly-extended shaft 15, to which a suitable turning-tool may be applied.

A die-carrier is attached to the forward end of the cylinder 7. This carrier has a laterally-extended flange 16 and a forwardly-extended peripheral flange 17. It also has a forwardly-extended flange 18, provided with a series of openings 19 for the passage of the threading device 20. As a means for adjusting the threading device inward or outward I provide a worm-wheel 21 for each die. This worm-wheel engages with teeth formed in the die, and it will be noted that the shaft of the worm-wheel has its bearings in the flanges 17 and 18. On the shaft of each worm-wheel is a pinion 22, and all of the pinions are engaged with a rack on a ring 23. The rack-ring is held from outward movement by means of a stop-ring 24, attached by screws or otherwise to the outer end of the die-carrier. The rack-ring may be moved in a rotary direction when desired to move the dies inward or outward by means of a pin 25, which extends outward through an arc slot 26, formed in the stop-ring 24. This pin 25 may be screw-threaded and provided with a thumb-nut $26^a$, so as to hold the rack as adjusted, and consequently holding the dies rigidly as adjusted, and as a further means for thus rigidly holding the parts a block 27 may be attached to the rack-ring and extended into the slot 26, and on this block is a threaded stud engaged by a set-nut 28.

In operation when a pipe or rod is in position and the thread-cutting dies engage therewith motion imparted to the cylinder 7 through the medium of the gears 12 and 13 will by its engagement with the feed-block 9 cause said cylinder to recede, and this of course will move the die-carrier, causing the dies to move lengthwise of the end of the pipe during their movement around the pipe, thus cutting the thread. When the thread is cut, the feed-block 9 may be raised and the cylinder 7 drawn forward, ready for new work without running back, by its thread connections. The pipe or rod of course will be rigidly held and properly centered by the jaws 3 and 4. Therefore I term these jaws "a self-centering vise."

Should it be found necessary to remove a bur from the thread, which may sometimes be left by the dies, the mechanism can be reversed, causing the dies to pass over the threads in the opposite direction, leaving a clean cut, and if no burs are present the device can be retracted or drawn outward by means of the ring-shaped rack, as before described. It will be noted that the gear-shaft rack is supported by and rotates upon the inner flange 18 of the die-carrier.

Having thus described my invention, I claim as new and desire to secure by Letters Patent—

1. In a thread-cutting machine, a casing, a cylinder mounted in the casing, means for imparting a lengthwise movement to said cylinder, means for imparting rotary movement to the cylinder, a die-carrier attached to the forward end of said cylinder, consisting of an outwardly-extended portion and inner and outer forwardly-extended flanges, dies movable through openings in the inner flange, worm-wheels engaging with said dies, pinions on the shafts of the worm-wheels, a ring-shaped rack engaging with the several pinions, the said rack being mounted to rotate on the said inner flange, a stop-ring attached to the outer flange, and a pin or the like extended from said rack through an arc slot in the stop-ring, substantially as specified.

2. In a thread-cutting machine, a casing, a cylinder mounted in the casing and having an exterior thread, a feed-block for engaging with said thread, a gear attached to the rear end of said cylinder, an elongated pinion with which said gear engages, a die-carrier attached to the forward end of said cylinder, consisting of an outwardly-extended portion and inner and outer forwardly-extended flanges, dies movable through openings in the interior flange, worm-wheels engaging with said dies, pinions on the shafts of the worm-wheels, a ring-shaped rack engaging with the several pinions, said rack being mounted to rotate on the said inner flange, and a stop-ring attached to the outer flange, substantially as specified.

In testimony whereof I have signed my name to this specification in the presence of two subscribing witnesses.

DLUAREJ NORWOOD JERAULD.

Witnesses:
 FRED ALBERT RUG,
 WILLIAM P. COLGAN.